US009156312B1

(12) United States Patent
Ruggeri

(10) Patent No.: US 9,156,312 B1
(45) Date of Patent: Oct. 13, 2015

(54) DRIVE AXLE FOR AN AGRICULTURAL OR INDUSTRIAL VEHICLE

(71) Applicant: DROMOS USA INC., Chicago, IL (US)

(72) Inventor: Paolino Ruggeri, Valsamoggia (IT)

(73) Assignee: DROMOS USA INC., Chicago, IL (US)

( * ) Notice: Subject to any disclaimer, the term of this patent is extended or adjusted under 35 U.S.C. 154(b) by 0 days.

(21) Appl. No.: 14/277,176

(22) Filed: May 14, 2014

(30) Foreign Application Priority Data

Apr. 29, 2014 (IT) .................. MI2014A0781

(51) Int. Cl.
*B60B 35/12* (2006.01)
*B60B 35/16* (2006.01)
*B60B 35/00* (2006.01)

(52) U.S. Cl.
CPC ............. *B60B 35/16* (2013.01); *B60B 35/003* (2013.01); *B60Y 2200/20* (2013.01); *B60Y 2200/22* (2013.01)

(58) Field of Classification Search
CPC .......... B62D 49/0678; B60Y 2200/22; B60B 2310/305; B60B 35/003; B60B 35/1054
See application file for complete search history.

(56) References Cited

U.S. PATENT DOCUMENTS

| | | | | |
|---|---|---|---|---|
| 2,603,302 | A * | 7/1952 | Anderson | 180/340 |
| 4,418,783 | A * | 12/1983 | Teraoka et al. | 180/209 |
| 4,445,586 | A * | 5/1984 | Schneider | 180/400 |
| 4,775,026 | A * | 10/1988 | Sollbach et al. | 180/249 |
| 5,121,808 | A * | 6/1992 | Visentini et al. | 180/435 |
| 5,282,644 | A * | 2/1994 | Larson | 280/638 |
| 6,206,125 | B1 * | 3/2001 | Weddle | 180/209 |
| 7,163,227 | B1 * | 1/2007 | Burns | 280/638 |
| 2013/0333959 | A1 * | 12/2013 | Wagemann et al. | 180/62 |
| 2014/0292064 | A1 * | 10/2014 | Hannukalnen et al. | 301/128 |
| 2015/0174958 | A1 * | 6/2015 | Riley | 301/128 |

FOREIGN PATENT DOCUMENTS

WO 2005118379 A1 12/2005

OTHER PUBLICATIONS

Italian Search Report and Written Opinion dated Jan. 9, 2015 for Italian patent application No. MI20140781.

* cited by examiner

*Primary Examiner* — Brodie Follman
(74) *Attorney, Agent, or Firm* — Novak Druce Connolly Bove + Quigg LLP

(57) ABSTRACT

A drive axle for an agricultural or industrial vehicle includes a central box-shaped body for containing a differential; two fixed tubular arms fixed by opposite parts to the box-shaped body; two tubular movable arms, each slidingly inserted in a respective fixed arm; two hubs, each connected to a respective movable arm to support respective wheels; two adjustment actuators, each active between a respective fixed arm and the corresponding movable arm to change the distance between hubs between a minimum distance configuration and a maximum distance configuration; an antirotation device active between each fixed arm and each movable arm; the antirotation device being active on opposite sides of fixed arms and movable arms.

20 Claims, 11 Drawing Sheets

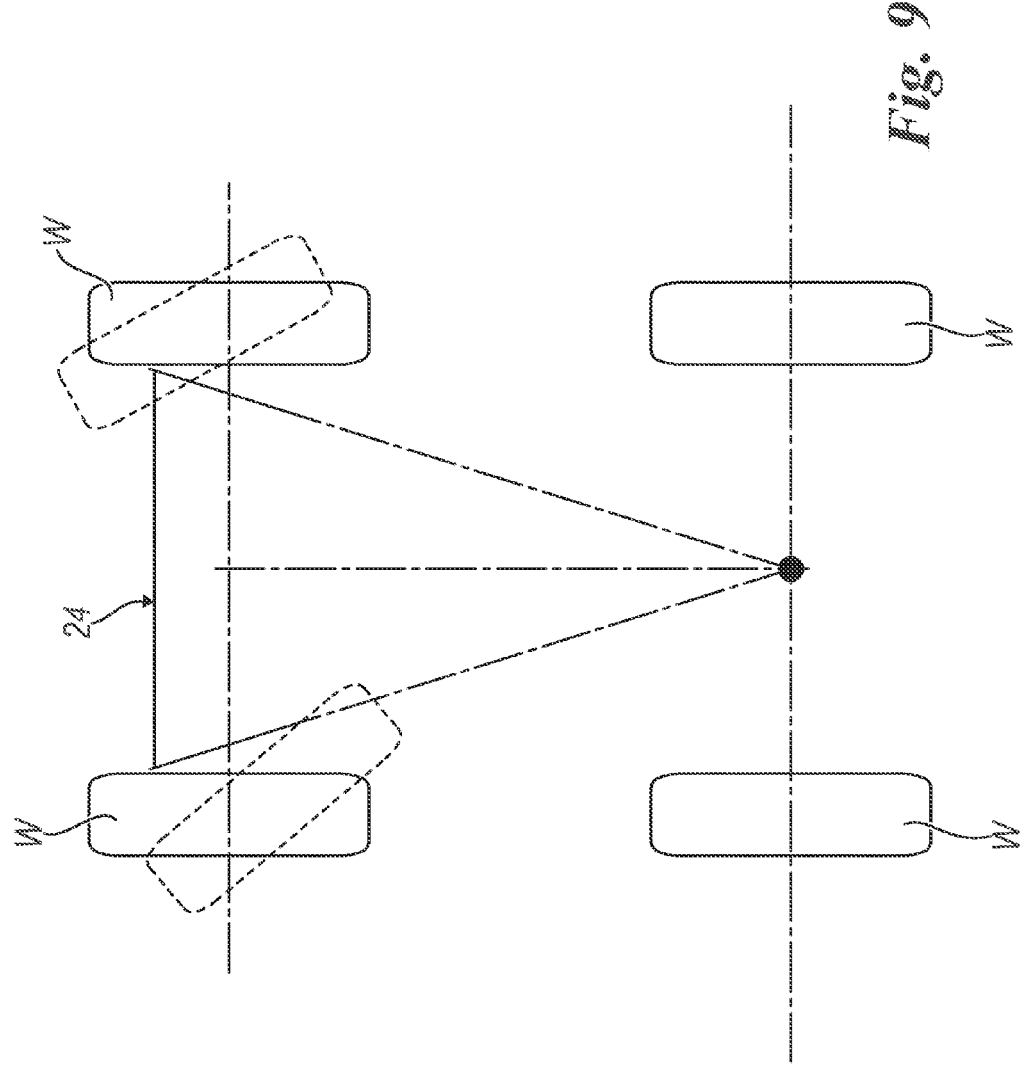

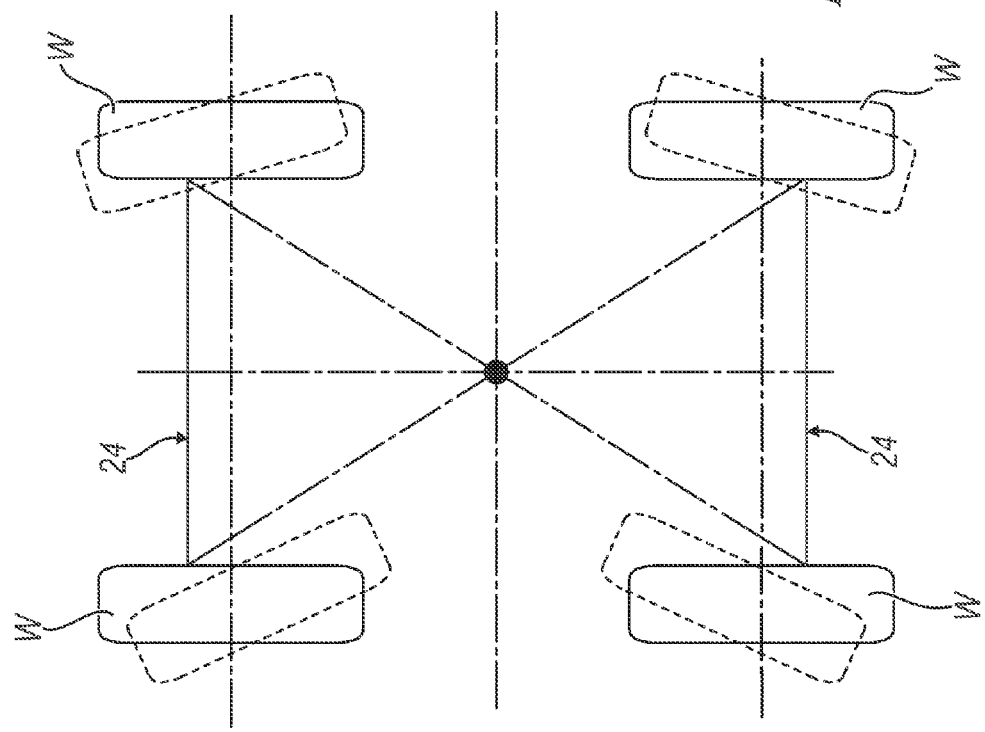

DRIVE AXLE FOR AN AGRICULTURAL OR INDUSTRIAL VEHICLE

CROSS-REFERENCE TO RELATED APPLICATIONS

This claims the benefit of Italian Patent Application no. MI2014A000781 filed Apr. 29, 2014, incorporated herein by reference in its entirety.

FIELD OF THE INVENTION

The present invention has as its end a drive axle for agricultural or industrial vehicles.

In particular, the present invention refers to a drive axle that can be adjusted in the track.

The present invention is advantageously applied in tractors, combine harvesters or other agricultural machines like self-propelled sprayers or even telehandlers, earth-moving machines or still others.

BACKGROUND OF THE PRESENT INVENTION

The known drive axles, in particular the adjustable drive axles, comprise two axle shafts each having two portions slidingly inserted one into the other. The hubs for the support of the wheels are fixed to the sliding positions of the axle shafts. In this way, the drive axle can be configured to assume a minimum track configuration and a maximum track configuration.

The hubs can be rigidly fixed to the sliding portions. In such case, a rigid drive axle or, in other words, nonsteering, is created.

Alternatively, the hubs can be rotatably bound to the sliding portions, thus defining a steering drive axle.

The drive axles of known type, disadvantageously, introduce problems in the stability of the coupling of the fixed and sliding portions of the axle shafts. This problem is further exacerbated by the fact that these axles are intended for agricultural or industrial machines that operate, obviously, on naturally uneven terrains like fields or work site roads.

Moreover, an additional disadvantage that can be identified in known drive axles is that the selectable configurations are only those of minimum and maximum track.

SUMMARY OF THE INVENTION

In this context, the technical task that is the basis of the present invention is to propose a drive axle for agricultural or industrial vehicles that overcomes the above-mentioned disadvantages of the state of the art.

In particular, it is the aim of the present invention to make available a drive axle for agricultural or industrial vehicles characterized by high stability and high reliability.

The specified technical task and the specific aim are essentially achieved by a drive axle for agricultural or industrial vehicles comprising the technical characteristics set forth in one or more of the joined claims.

BRIEF DESCRIPTION OF THE DRAWINGS

Additional characteristics and advantages of the present invention will be clearer from the indicative, and therefore not limiting, description of one preferred but not exclusive embodiment of a drive axle for agricultural or industrial vehicles, as illustrated in the attached drawings in which:

FIG. 9 is a schematic view of a vehicle comprising the drive axle in accord with the present invention; and FIG. 10 is a schematic view of a vehicle comprising the drive axle in accord with one version of the present invention.

DETAILED DESCRIPTION OF THE PREFERRED EMBODIMENTS

Figure 1A:
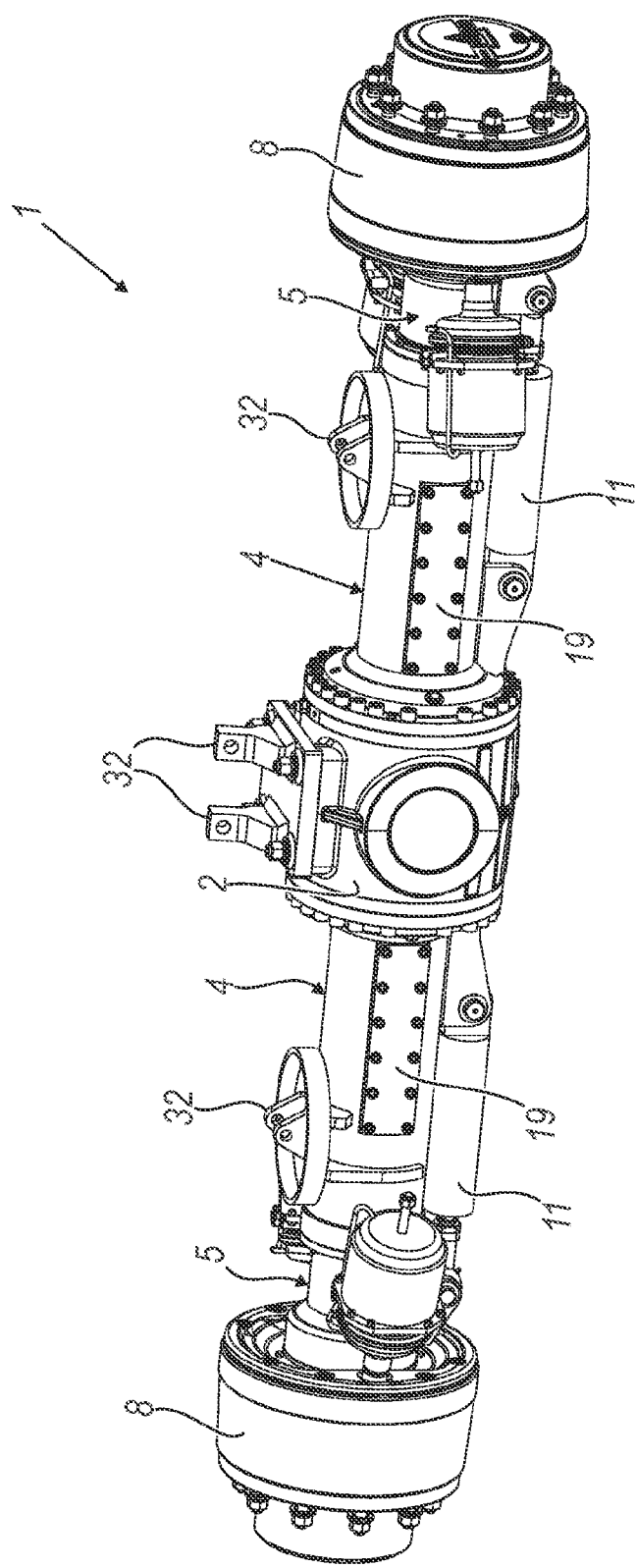
FIG. 1a is a perspective view of a drive axle for agricultural or industrial vehicles in accord with one first embodiment of the present invention.

With reference to the attached Figures, 1 in general indicates a drive axle for agricultural or industrial vehicles in accord with the present invention. Drive axle 1 comprises a central box-shaped body 2 and a differential 3 contained in the same box-shaped body 2. Box-shaped element 2 is a hollow shaped element that in this case is able to contain the mechanical element of the differential. FIG. 1a shows box-shaped element 2 as substantially cylindrical but it may be of any suitable shape able to contain the mechanical element of the differential. Differential 3 is of known type and will not be further described here.

Drive axle 1 comprises, moreover, two fixed arms 4 fixed to the box-shaped body 2 on opposite sides. Fixed arms 4 are hollow tubular bodies that go in a rectilinear direction.

Fixed arms 4 are coaxially aligned.

In detail, fixed arms 4 comprise a first extremity 4a fixed to the box-shaped body 4 and a second extremity 4b, opposite the first, projecting.

Drive axle 1 comprises, moreover, two movable arms 5 slidingly coupled in a respective fixed arm 4. Movable arms 5 are also hollow tubular bodies that go in a rectilinear direction.

The outside diameter of movable arms 5 is less than the inner diameter of fixed arms 4. In this way, movable arms 5 are slidingly inserted in fixed arms 4.

Each movable arm 5 has a first extremity 5a inserted inside respective fixed arm 4 and a second extremity 5b, opposite the first, external and projecting.

Each fixed arm 4 with respective movable arm 5 defines a telescopic unit.

Gaskets 31 are placed between fixed arms 4 and movable arms 5 in order to avoid spillage of lubricant placed precisely between the arms in order to facilitate sliding.

A guide unit 30 is interposed between each fixed arm 4 and each movable arm 5.

This guide unit 30, also called special bushing, maintains movable arms 5 concentric with respect to fixed arms 4, also with the aim of allowing gaskets 31 to hold the lubricant.

Gasket 31 is fixed to corresponding fixed arm next to second extremity 4b and slidingly associated with movable arm 5.

Drive axle 1 comprises, moreover, two axle shafts 6 that go from differential 3 inside fixed arms 4 and movable arms 5 and coaxially to them.

Each axle shaft 6 comprises two distinct and aligned portions 6a, 6b. Each fixed portion 6a is directly connected to differential 3 and has a splined (or flueted) lateral surface. This lateral surface engages in a respective broach bushing 7, inserted coaxially inside corresponding fixed arm 5 and/or movable arm 6.

Each movable portion 6b has, at least partially, a splined lateral surface that is slidingly in broach bushing 7 to be set in rotation and to be able to slide telescopically and in harmony with respective movable arm 5.

Drive axle 1 comprises, moreover, two hubs 8 in order to support respective wheels "W," each associated with a movable arm 5, next to second extremity 5b.

Hubs 8 comprise a planetary reducer 9 connected to axle shaft 6 and in particular to the movable portion 6b of axle shaft 6. Moreover, hubs 8 comprise a brake 10.

Figure 1B:
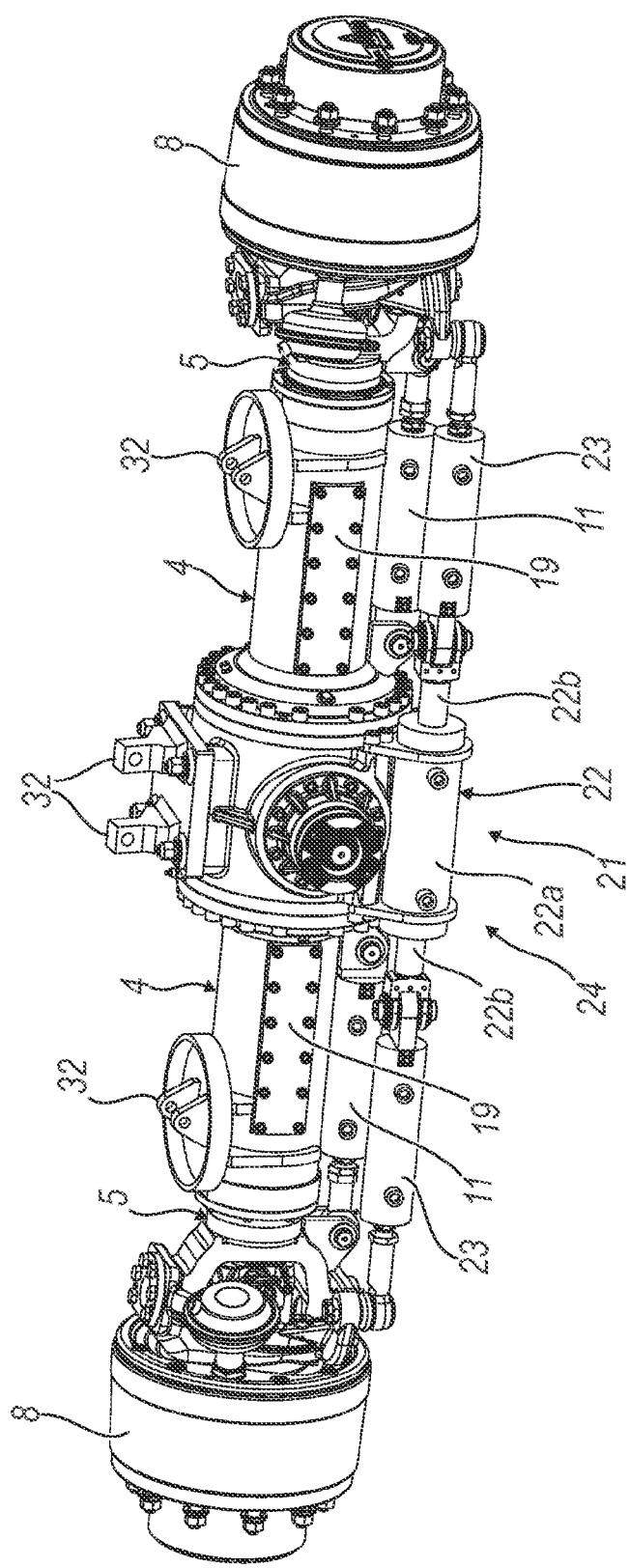
FIG. 1b is a perspective sight of a drive axle for agricultural or industrial vehicles in accord with a second embodiment of the present invention.
Figure 2:
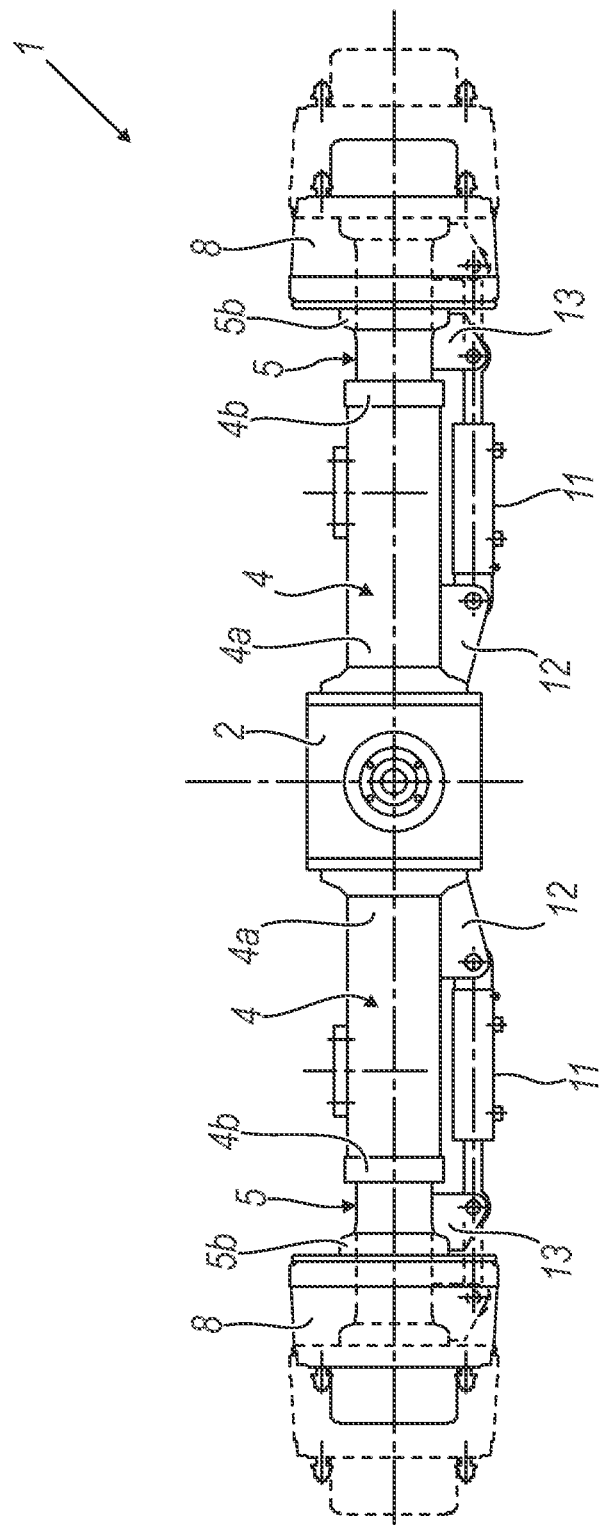
FIG. 2 is a lateral view of the drive axle of FIG. 1.
Figure 3:
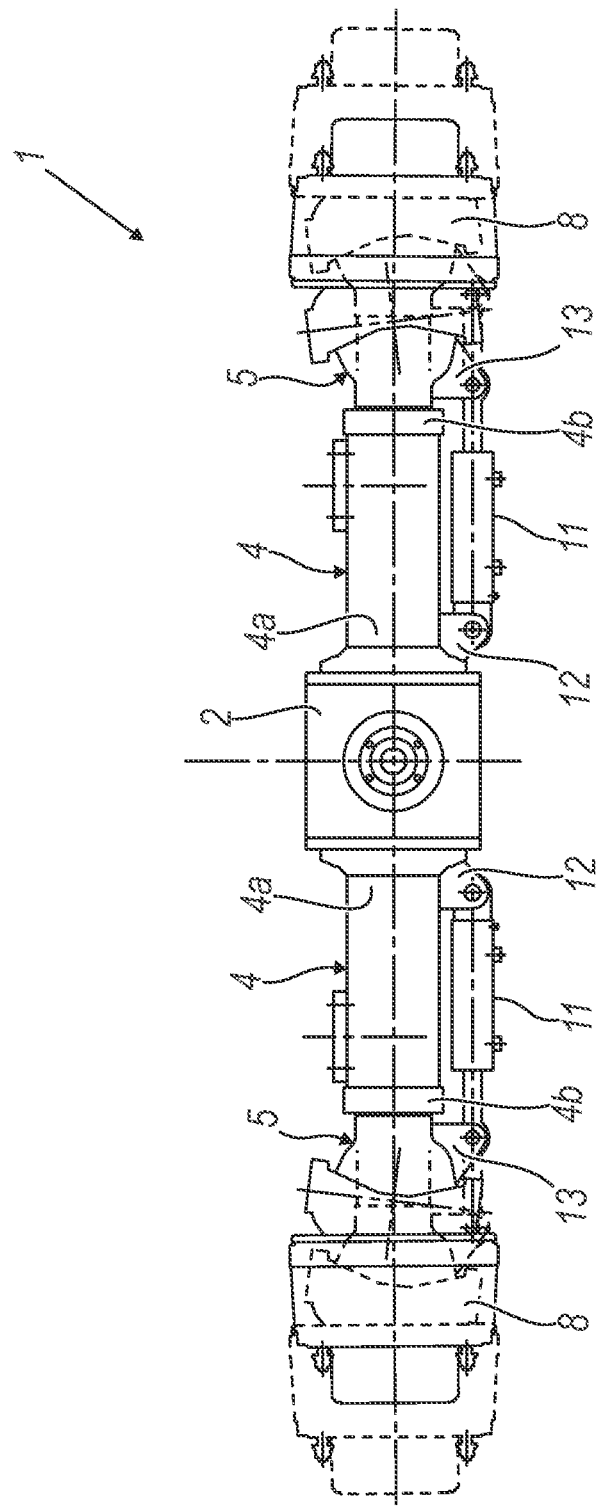
FIG. 3 is a lateral view of a drive axle for agricultural or industrial vehicles in accord with the embodiment of FIG. 2.
Figure 4:
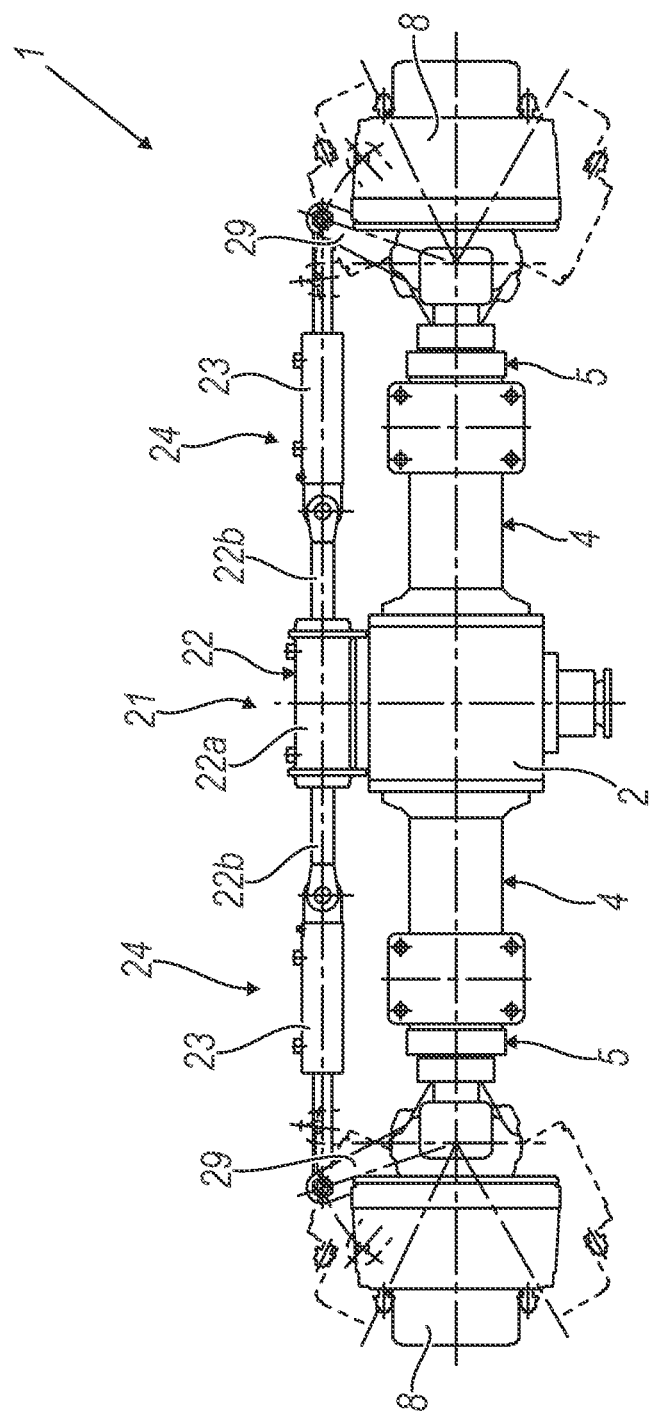
FIG. 4 is a plan view of the drive axle according to the second embodiment of FIG. 3.
Figure 5:
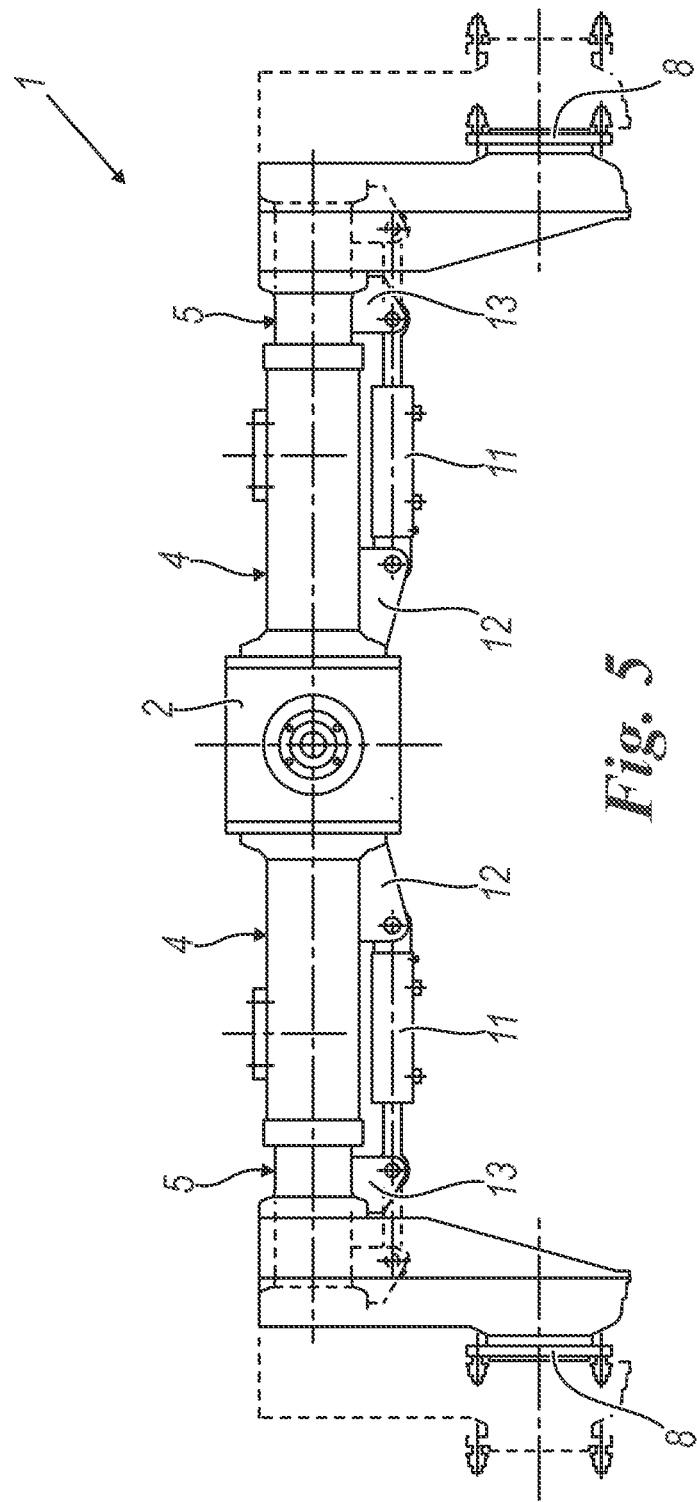
FIG. 5 is a lateral view of a drive axle for agricultural or industrial vehicles in accord with a further embodiment version of the present invention.
Figure 6:
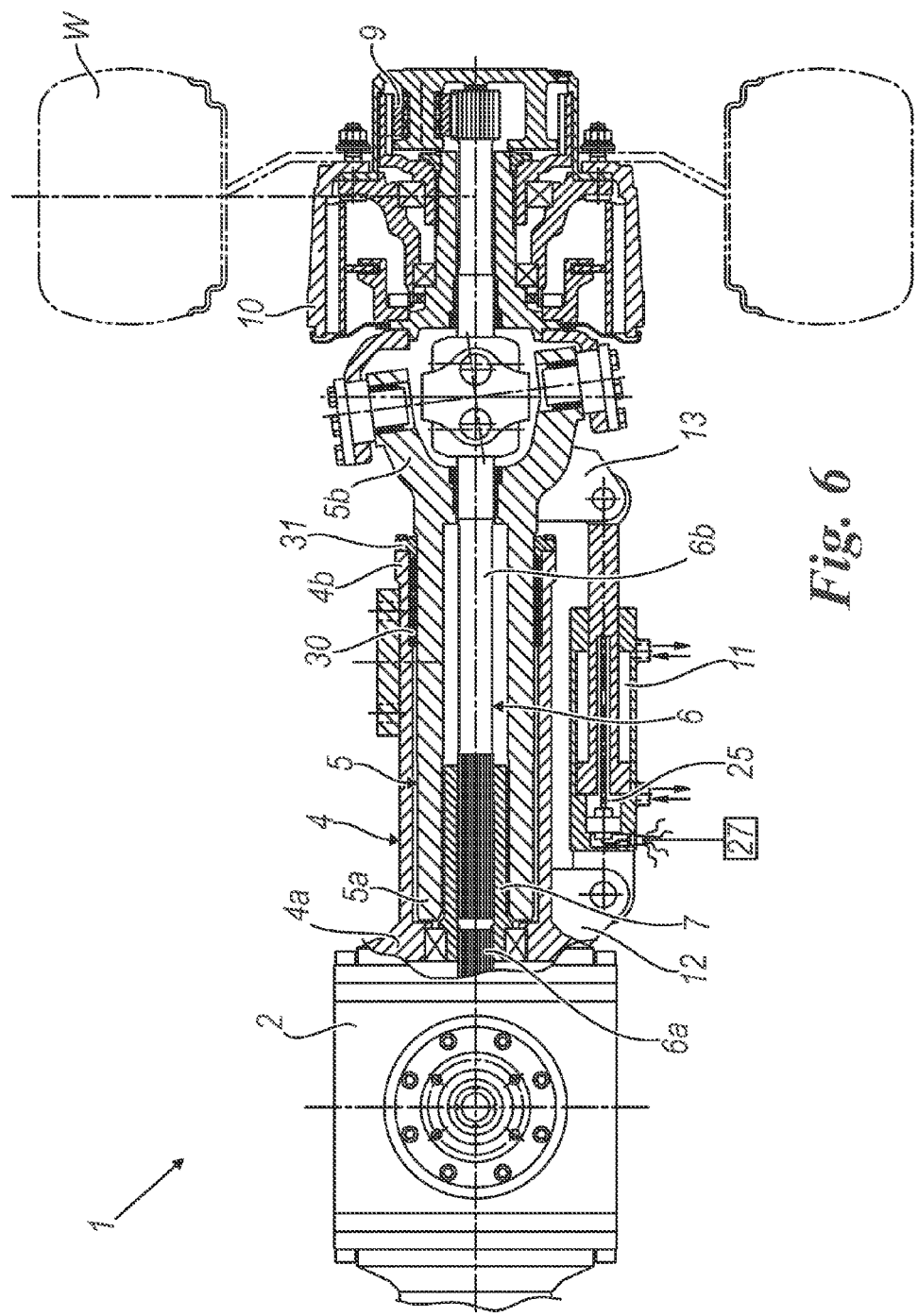
FIG. 6 is a lateral view partially in cross-section of a detail of the drive axle of FIGS. 1 and 2.
Figure 7:
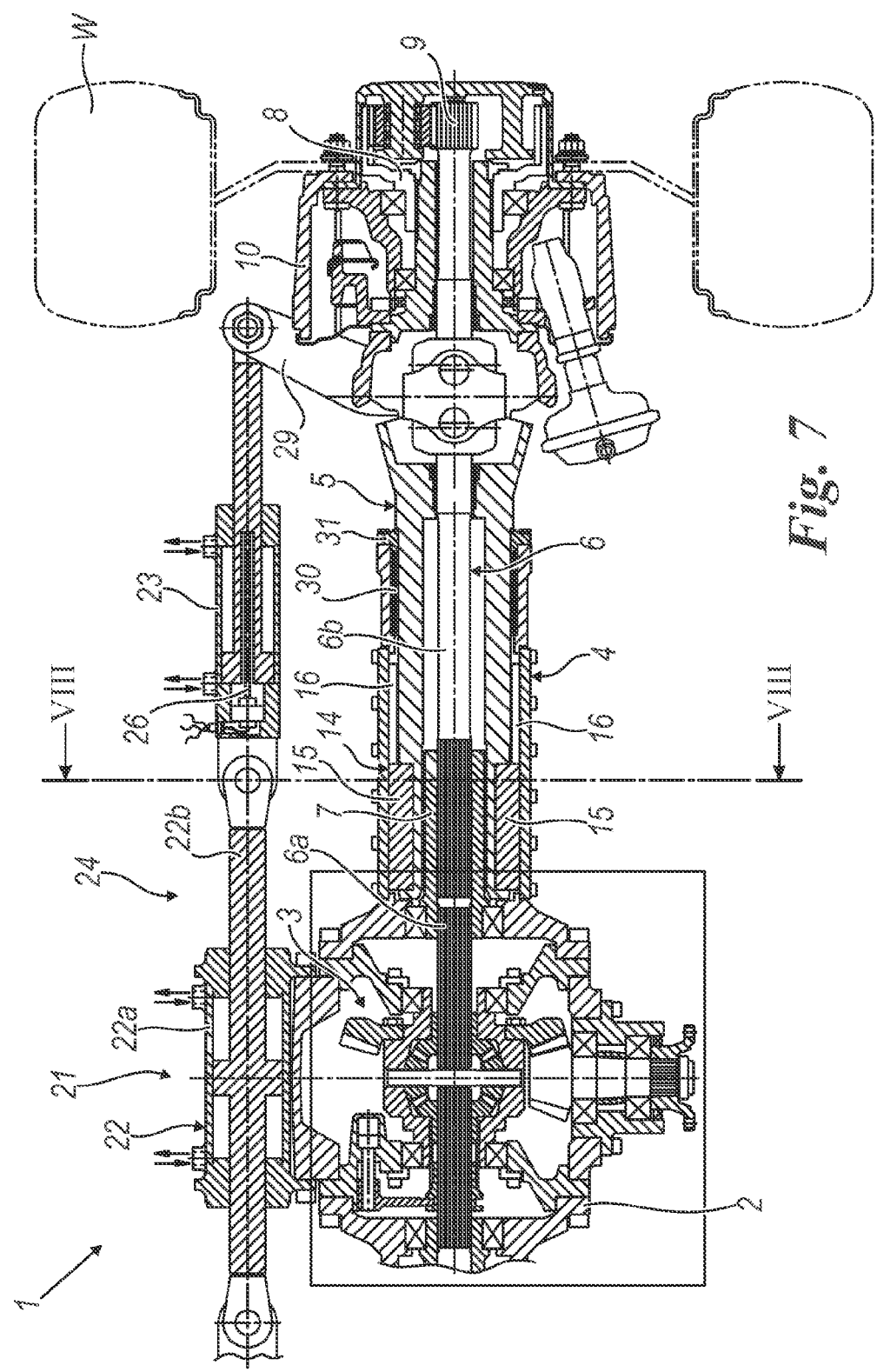
FIG. 7 is a plan cross-section view of the drive axle of FIG. 3.
Figure 8:
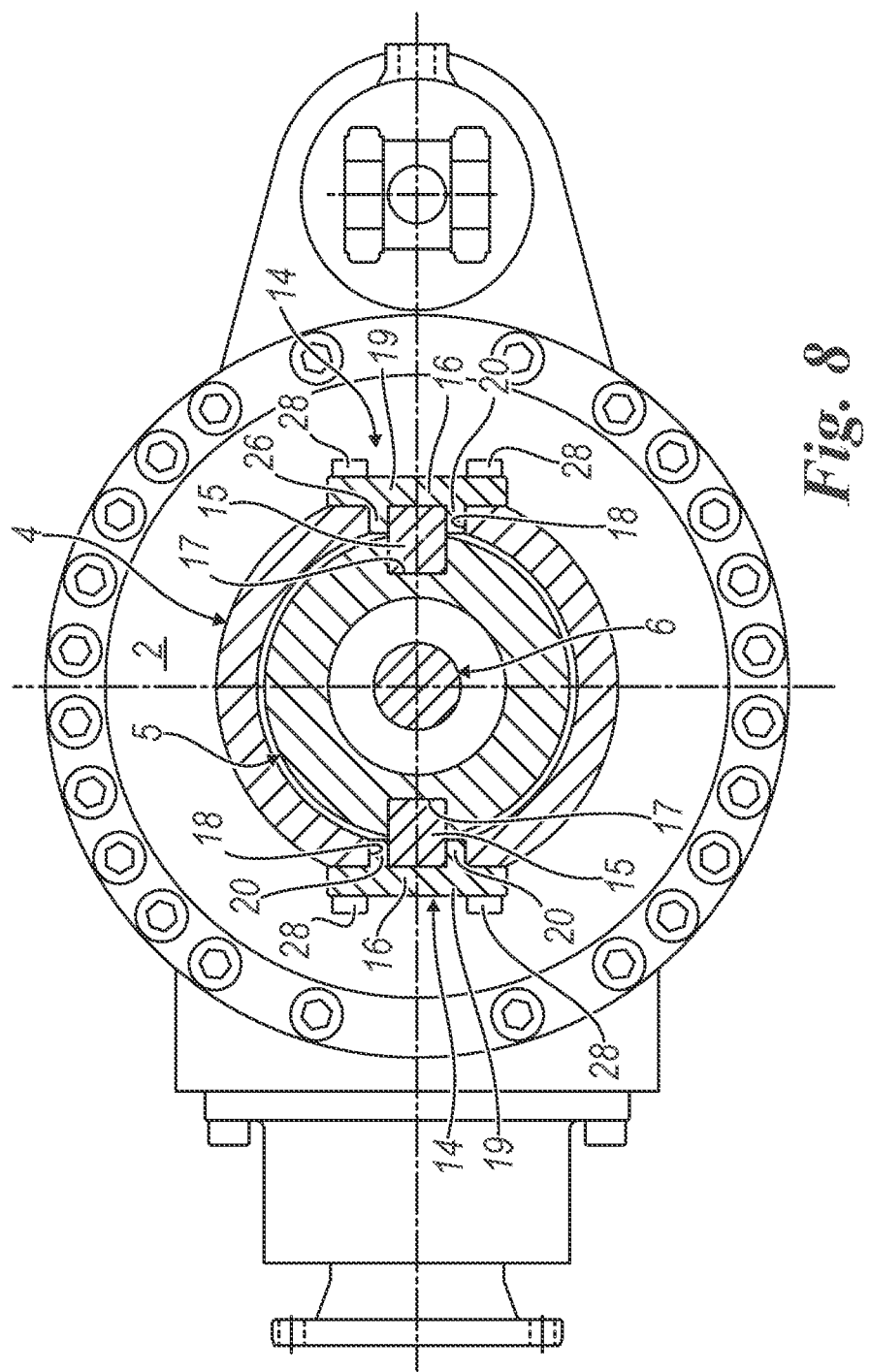
FIG. 8 is a cross-section view of the drive axle illustrated in FIG. 6 in the plane of cross-section VIII-VIII.

Preferably, hubs 8 are aligned with movable arms 5 (FIGS. 1a, 1b and 2). In one embodiment version, hubs 8 are misaligned with respect to movable arms 5 in order to increase the distance of drive axle 1 from the road surface (FIG. 5). In this case, a special transmission will transfer the mechanical power from axle shafts 6 to hubs 8.

In a first embodiment, hubs 8 are bound to movable arms 5 in a rigid manner. A rigid drive axle is created in this way.

In a second embodiment, hubs 8 are rotatably bound to movable arms 5 in order to bring about a steering drive axle. In particular, hubs 8 are hinged to movable arms 7 in known manner.

In both embodiments, drive axle 1 comprises, moreover, two adjustment actuators 11, each operating between respective fixed arm 4 and corresponding movable arm 5.

In the detail, a first clamp 12 is welded to fixed arm 4 and a second clamp 13 is welded to movable arm 5.

Each adjustment actuator 11 is fixed between first 12 and second clamp 13.

Each adjustment actuator 11 is arranged parallel to respective fixed arm 4 and movable arm 5.

Adjustment actuators 11 allow moving movable arms 5 with respect to fixed arms 4 in order to increase or to decrease the distance between hubs 8 and to change, therefore, the track of drive axle 1.

Advantageously, any intermediate configuration between that at a minimum distance and that at a maximum distance can selectively be set up according to the specific requirements.

In both embodiments, drive axle 1 comprises an antirotation device 14 active between fixed arms 4 and movable arms 5. In this way, rotation movements are prevented between fixed arms 4 and movable arms 5 that would cause dangerous misalignments of the wheels.

Advantageously, antirotation device 14 is interposed between each fixed arm 4 and each movable arm 5. More in detail, antirotation device is placed, and acts, on two diametrically opposite sides of each fixed arm 4 and each movable arm 5.

Antirotation device 14 comprises two tabs (or feathers) 15 associated with each movable arm 5 slidingly associated with two fixed slide guides 16 associated with each fixed arm 4 and turned toward tabs 15.

Two tabs 15 are placed next to an external surface of each movable arm 5 on diametrically opposite positions.

Tabs 15 are lengthened bars of rectangular cross-section. They are fixed, by interference, to corresponding flutes 17 made next to an external surface of each movable arm 5, at least partially along the length of each movable arm 5.

Two guides 16 are placed next to tabs 15 in diametrically opposite positions of each fixed arm 4.

In detail, guides 16 are lodged in passing slots 18 obtained, at least partially, along the length of each fixed arm 4 so as to come out next to an internal surface of each fixed arm 4.

Each guide 16 comprises a support slab 19 that can be fixed, by fixing means 28, to the external surface of each fixed arm 4, and two central slabs parallel between themselves and orthogonal to support slab 19 and fixed or made in one piece with the latter. As an example, fixing means 28 are screws or bolts.

The sliding seat for corresponding tab 15 is defined between central slabs 20 and support slab 19.

The length of guides 16 is essentially equal to the sum of the length of tabs 15 plus the possible distance of movable arms 5 with respect to fixed arms 4. The length of guides 16 is greater than the length of tabs 15 so as to guarantee the complete sliding of tabs 15 in guides 16 during movement of movable arms 5 along fixed arms 4.

Note that each tab 15 lodges perfectly and exactly in corresponding guides 16.

Three contact surfaces can, in fact, be defined for each tab 15 lodged in related guide 16. A first contact surface is defined between tab 15 and guide 16 next to main slab 19. A second and a third contact surface are, instead, defined between tab 15 and guide 16 next to two central slabs 20.

This coupling guarantees that drive axle 1 supports a plurality of possible stresses during use, guaranteeing in this way the necessary stability and reliability of drive axle 1 itself.

Antirotation device 14 thus conceived allows, first of all, offering increased resistance to torsional stresses, preventing, as said, the rotation of movable arms 5 with respect to fixed arms 4. In addition, antirotation device 14 allows efficiently bearing horizontal stresses thanks to the first contact surface. Moreover, antirotation device 14 allows efficiently bearing vertical stresses thanks to the second and the third contact surface. Finally, the described configuration allows increased efficiency in bearing bending loads.

In the second embodiment, that is, the steering drive axle, drive axle 1 comprises, moreover, a movement unit 21 active on hubs 8 in order to rotate them and to allow sudden turning.

Movement unit 21 comprises a dual rod drive actuator (or steering actuator) 22, preferably hydraulic. Cylinder 22a of drive actuator 22 is fixed to box-shaped body 2, while rods 22b are connected to hubs 8.

Still in the second embodiment (steering axle), drive axle 1 comprises, moreover, two adjustment actuators 23 placed between drive actuator 22 and respective hubs 8.

The two adjustment actuators 23 allow adjusting the distance between drive actuator 22 and hubs 8 on changing the track.

It should be said that adjustment actuators 23 remain rigidly in position when running in order to maintain the track constant.

During a steering maneuver, drive actuator 22 is activated in the desired direction, while adjustment actuators 23 remain stationary.

Steering drive axle 1 comprises, moreover, two coupling levers 29 in order to fix the rods of adjustment actuators 23 to hubs 8.

Drive actuator 22 and adjustment actuators 23 are arranged in a rectilinear configuration and essentially parallel to fixed arms 4 and movable arms 5.

Preferably, in the second embodiment, drive actuator 22 and adjustment actuators 23 define a coupling bar 24.

Coupling bar 24 thus defined is fixed between hubs 8. As said, coupling bar 24 is parallel to fixed arms 4 and to movable arms 5.

Steering drive axle 1 in accord with the second embodiment is configured so as to guarantee the so-called "correct turn", that is, a different rotation of hubs 8 in accord with the various radii of curvature of the courses of the two wheels "W".

Considering drive axle 1, in the second embodiment, mounted on a vehicle having an additional drive axle 1 (in the first embodiment, that is, rigid), coupling bar 24 has respective extremities placed on straight lines that conjoin the centers of rotation of hubs 8 with the center of additional rigid drive axle 1. By "center of rigid drive axle 1" is meant a point equidistant from hubs 8 and lying on the rotation axis of axle shafts 6.

This geometrical configuration is constantly maintained regardless of the length of the track chosen and set up. In order to do this, the extension of adjustment actuators 23 is determined so that the extremities of coupling bar 24 lies on the aforesaid straight lines.

This allows differentiating the rotation angle of hubs 8 in case of sudden turning.

In use, adjustment actuators 11 and, in the case of the second embodiment, also drive actuator 22 and adjustment actuators 23 are connected to a hydraulic system (not part of the present invention) of the vehicle.

Advantageously, adjustment actuators 11 and adjustment actuators 23 in the second embodiment are supplied with fluid to a pressure between 350 bars and 450 bars, preferably 400 bars. Such pressure allows opening the block valves installed on the hydraulic system of the vehicle.

Such hydraulic block valves will allow offering notable resistance to lateral impacts that could inadvertently and undesirably reduce the track when running.

Drive actuator 22 is supplied with a fluid at a pressure between 200 bars and 300 bars, preferably 250 bars.

Advantageously, drive axle 1, both in the first and in the second embodiment, comprises at least a sensor 25 associated with each adjustment actuator 11 in order to detect the extension. Sensors 25 are, as an example, of magnetostrictive type.

In the second embodiment (steering drive axle), drive axle 1 comprises additional sensors 26 associated with adjustment actuators 23 in order to detect the extension. Additional sensors 26 are, as an example, of magnetostrictive type.

A control unit 27 is functionally connected to sensors 25 and, in the second embodiment, also to additional sensors 26 in order to acquire respective representative signals of the extension of adjustment actuators 11 generated by sensors 25 and, in the second embodiment, in order to acquire respective representative signals of the extension of adjustment actuators 23 generated by additional sensors 26.

Control unit 27 detects, therefore, instant by instant, the value of the extension of the actuators and compares this value with a reference value preset and directly dependent on the desired and set track value.

Control unit 27 imposes possible corrections of the case by means of a feedback cycle in order to maintain the track value constant, acting by means of the hydraulic system of the vehicle.

Drive axle 1 comprises, moreover, a plurality of connecting units 32 in order to fix drive axle 1 to the chassis of a vehicle. According to what is illustrated, drive axle 1 comprises a coupling body fixed to box-shaped body 2 and two coupling units 32 fixed to fixed arms 4.

A vehicle that comprises at least a drive axle in accord with what is described above is also part of the present invention.

In particular (see FIG. 9), the vehicle comprises a chassis, a first drive axle 1 in the first embodiment (nonsteering) and a second drive axle 1 in the second embodiment (steering).

As said, coupling bar 24 of the second drive axle 1 (steering) is defined by drive actuator 22 and adjustment actuators 23, mounted between themselves in series, and fixed to hubs 8.

Coupling bar 24 has its respective extremities placed on straight lines that conjoin the centers of rotation of hubs 8 with a center of the first drive axle 1 (rigid).

In this way, a vehicle capable of carrying out the so-called "correct turn" is made.

In this embodiment, coupling bar 24 is placed in a position opposite first drive axle 1 (rigid) with respect to the second drive axle 1 (steering).

Also a configuration in which coupling bar 24 is placed between first and second drive axle 1 is allowed.

In an additional embodiment of the vehicle (FIG. 10), both drive axles 1 can be in accord with the second embodiment, that is, both are steering.

In this case, the coupling bars 24 of the two drive axles 1 have respective opposite extremities lying on straight lines that diagonally conjoin the centers of rotation of hubs 8 of first steering axle 1 with the centers of rotation of hubs 8 of second steering axle 1.

The conjoining straight lines pass through a geometric center of the two drive axles 1.

The present invention achieves the end set.

In fact, use of the antirotation device that acts on two diametrically opposite points of the coupling between fixed arms and movable arms improves in an obvious way the stability of the drive axle and its reliability.

The invention claimed is:

1. A drive axle for an agricultural or industrial vehicle comprising:
    a central box-shaped body for containing a differential;
    two fixed tubular arms fixed by opposite parts to the box-shaped body;
    two tubular movable arms, each slidingly inserted in a respective fixed arm;
    two hubs, each connected to a respective movable arm to support respective wheels;
    two adjustment actuators, each active between a respective fixed arm and the corresponding movable arm in order to change the distance between hubs between a minimum distance configuration and a maximum distance configuration;
    an antirotation device active between each fixed arm and each movable arm;
    said antirotation device being active on opposite sides of fixed arms and movable arms.

2. The drive axle according to claim 1, wherein the antirotation device comprises at least two tabs externally fixed to each movable arm and respective slide guides fixed to respective fixed arms and turned toward said tabs.

3. The drive axle according to claim 2, wherein said fixed arms and said movable arms have circular cross-section; said tabs and said guides being placed in diametrically opposite position between fixed arms and movable arms.

4. The drive axle according to claim 3, wherein said guides are lodged in respective slots obtained along the length of fixed arms and fixed to these latter by fixing means.

5. The drive axle according to claim 4, wherein said tabs are lodged in respective flutes obtained along the length of movable arms and fixed to these by groove.

6. The drive axle according to claim 5, wherein said hubs are rotatably connected to said movable arms; said steering drive axle comprising, moreover, a movement unit active on hubs in order to rotate them; said movement unit comprising a dual rod drive actuator fixed to said box-shaped body and connected to said hubs.

7. The drive axle according to claim 6, further comprising two adjustment actuators functionally interposed between drive actuator and each hub.

8. The drive axle according to claim 7, comprising a coupling bar fixed to hubs; said coupling bar being parallel to the course of fixed arms and movable arms.

9. The drive axle according to claim 8, wherein said drive actuator and said adjustment actuators define said coupling bar.

10. The drive axle according to claim 9, wherein said coupling bar has respective extremities placed on straight lines conjoining the centers of rotation of the hubs with a center of an additional drive axle that can be associated with a vehicle.

11. The drive axle according to claim 10, wherein any intermediate configuration between that at a minimum distance and that at a maximum distance can selectively be set up.

12. The drive axle according to claim 11, comprising a sensor associated with each adjustment actuator in order to evaluate its extension; said drive axle comprising, moreover, a control unit connected to said sensor in order to compare, instant by instant, a detected value of said extension with a preset reference value.

13. An agricultural or industrial vehicle comprising a chassis, a first drive axle in accord with claim 1 and a second drive axle in accord with claim 6, said second drive axle comprising a coupling bar fixed to hubs and parallel to the course of fixed arms and movable arms of said second drive axle; said coupling bar having respective extremities placed on straight lines conjoining the centers of rotation of hubs with a center of first drive axle.

14. The drive axle according to claim 2, wherein said tabs are lodged in respective flutes obtained along the length of movable arms and fixed to these by groove.

15. The drive axle according to claim 1, wherein said hubs are rotatably connected to said movable arms; said steering drive axle comprising, moreover, a movement unit active on hubs in order to rotate them; said movement unit comprising a dual rod drive actuator fixed to said box-shaped body and connected to said hubs.

16. The drive axle according to claim 1, wherein any intermediate configuration between that at a minimum distance and that at a maximum distance can selectively be set up.

17. The drive axle according to claim 1, comprising a sensor associated with each adjustment actuator in order to evaluate its extension; said drive axle comprising, moreover, a control unit connected to said sensor in order to compare, instant by instant, a detected value of said extension with a preset reference value.

18. The agricultural or industrial vehicle according to claim 13, wherein the antirotation device of the drive axle comprises at least two tabs externally fixed to each movable arm and respective slide guides fixed to respective fixed arms and turned toward said tabs.

19. The agricultural or industrial vehicle according to claim 18, wherein said fixed arms of the drive axle and said movable arms have circular cross-section; said tabs and said guides being placed in diametrically opposite position between fixed arms and movable arms.

20. The agricultural or industrial vehicle according to claim 19, wherein said guides are lodged in respective slots obtained along the length of fixed arms and fixed to these latter by fixing means.

\* \* \* \* \*